Figure 1:
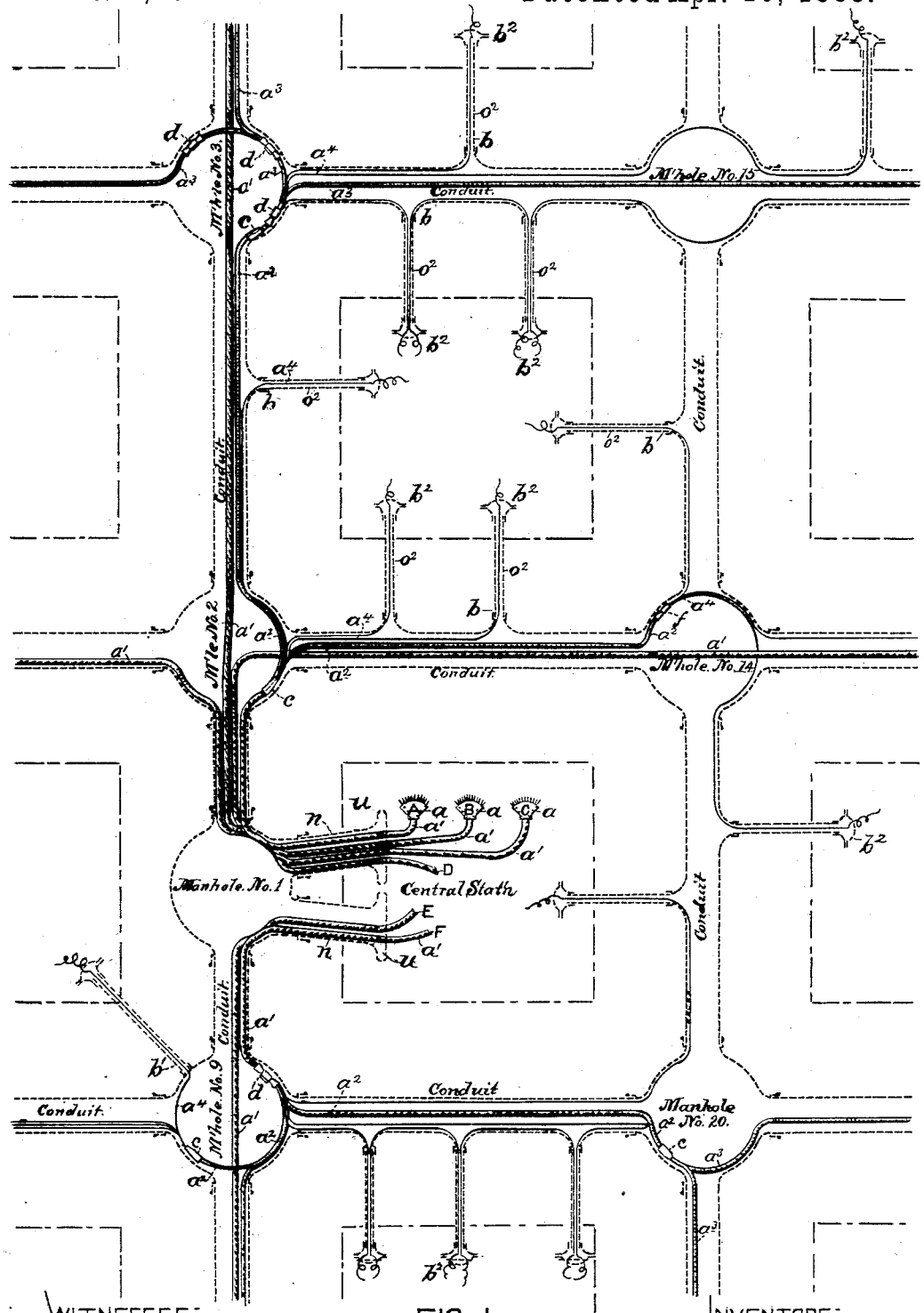

(No Model.) 8 Sheets—Sheet 1.

W. H. HART & J. T. GOODFELLOW.
SYSTEM OF ELECTRICAL DISTRIBUTION.

No. 380,757. Patented Apr. 10, 1888.

WITNESSES:
B. H. Dawson.
Thos. G. Cook

INVENTORS:
William H. Hart
James Thom Goodfellow (No Model.) 8 Sheets—Sheet 2.
W. H. HART & J. T. GOODFELLOW.
SYSTEM OF ELECTRICAL DISTRIBUTION.
No. 380,757. Patented Apr. 10, 1888.
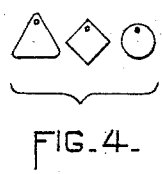
FIG. 4.
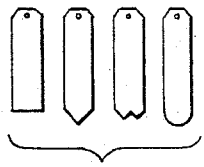
FIG. 3.
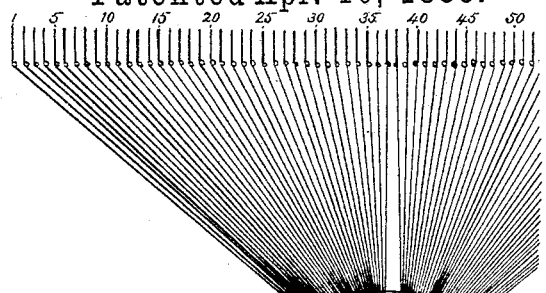
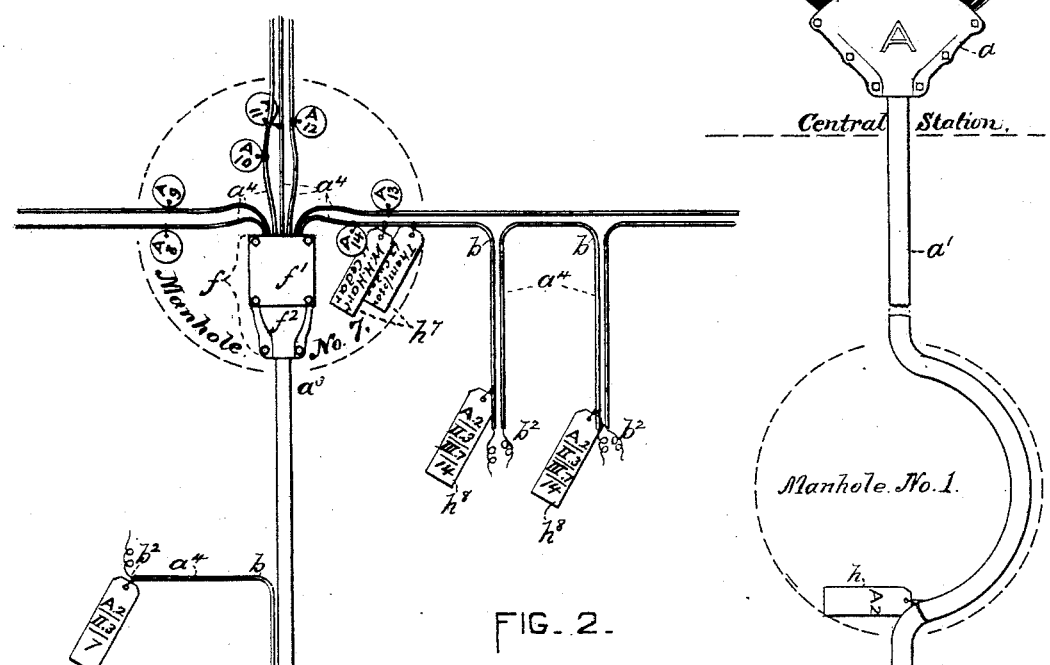
FIG. 2.
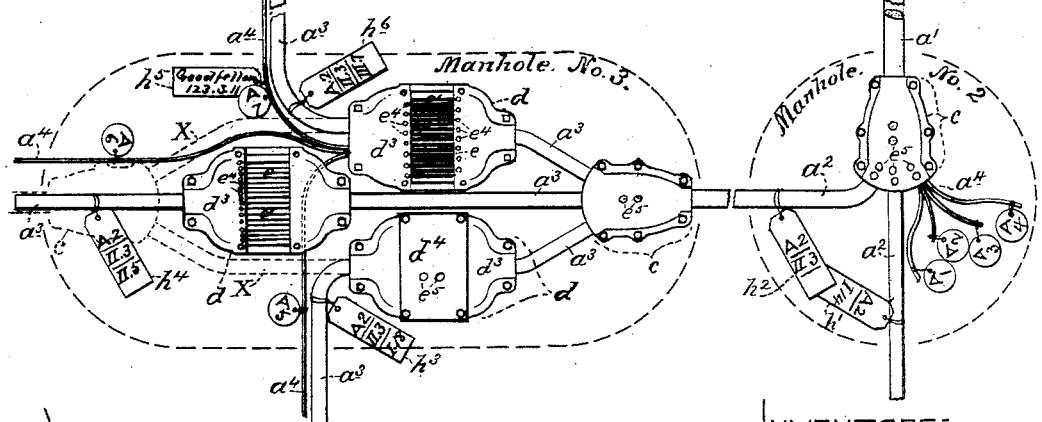
WITNESSES:
R. H. Dawson
Thos. G. Cook
INVENTORS:
William H. Hart
James Thorn Goodfellow

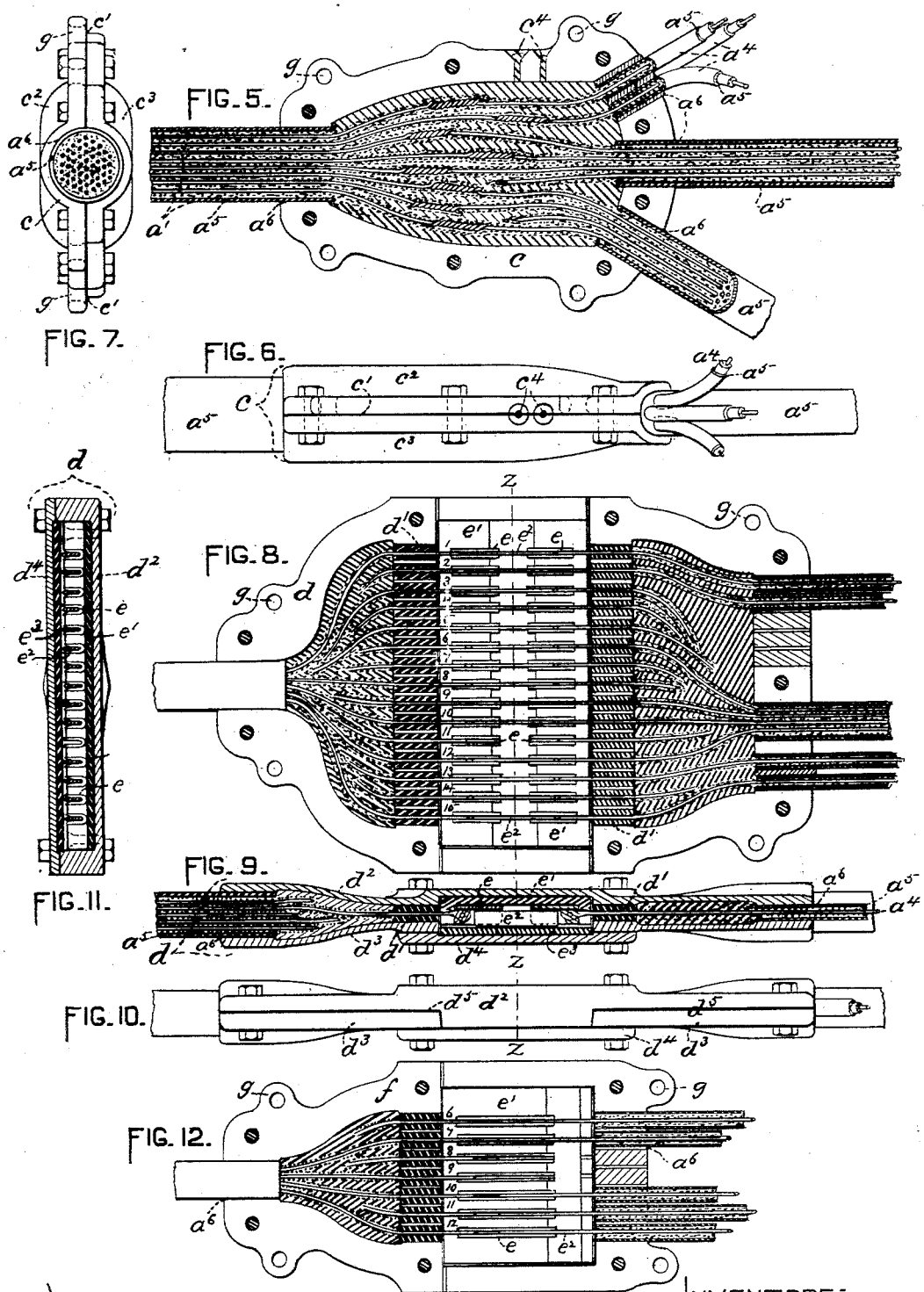

(No Model.) 8 Sheets—Sheet 4.
W. H. HART & J. T. GOODFELLOW.
SYSTEM OF ELECTRICAL DISTRIBUTION.
No. 380,757. Patented Apr. 10, 1888.
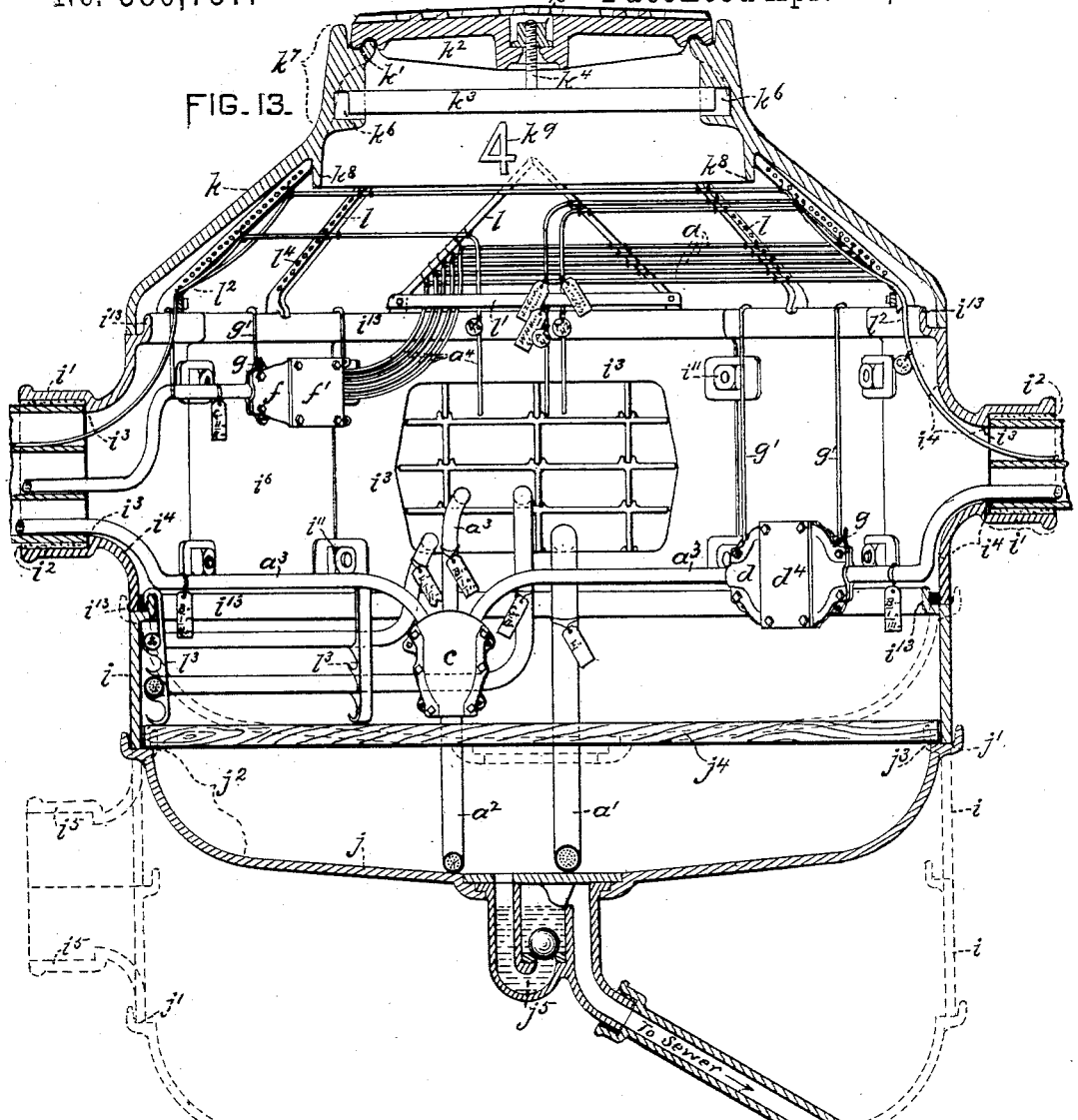
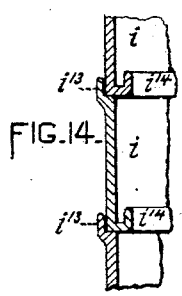
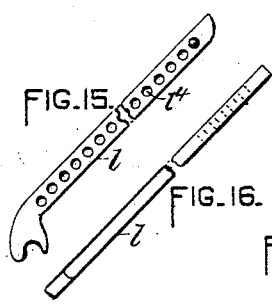
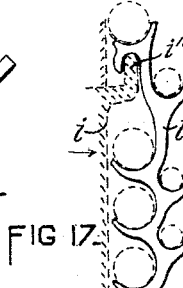
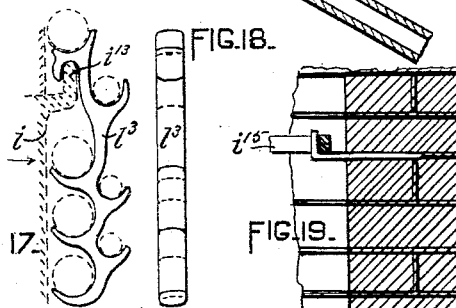
WITNESSES:
A. M. Dawson.
Thos. G. Cook.
INVENTORS:
William H. Hart
James Thorn Goodfellow

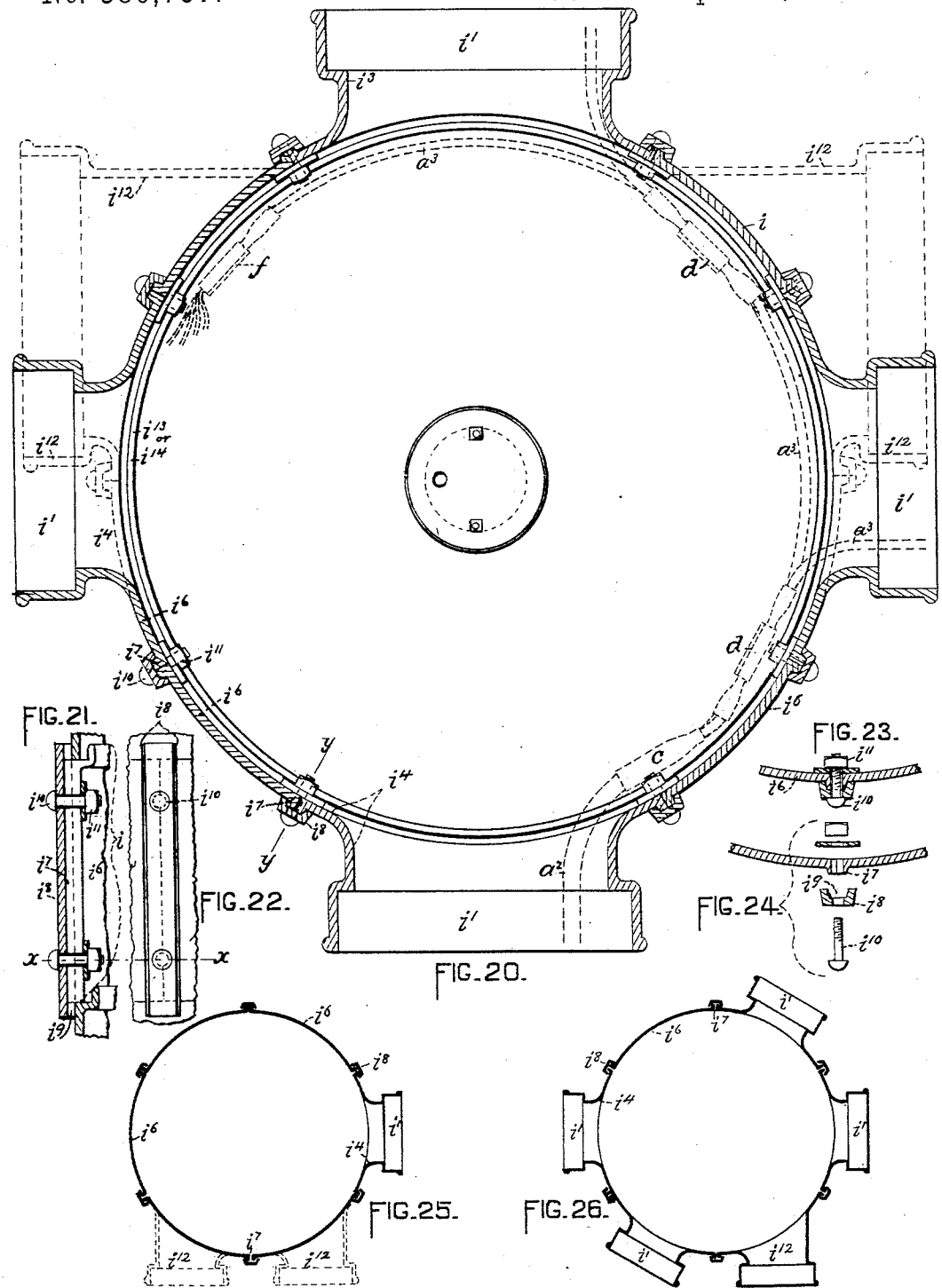

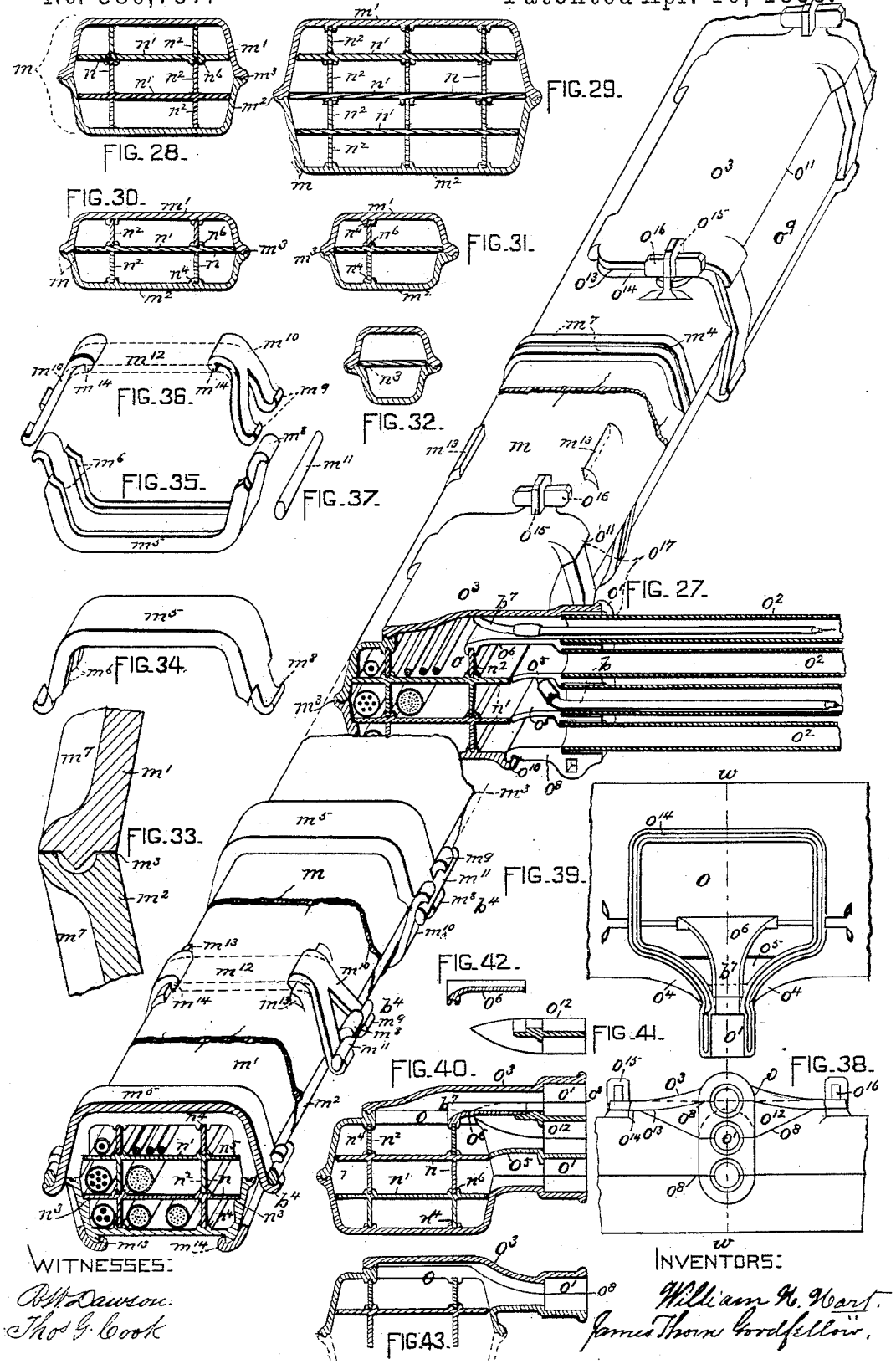

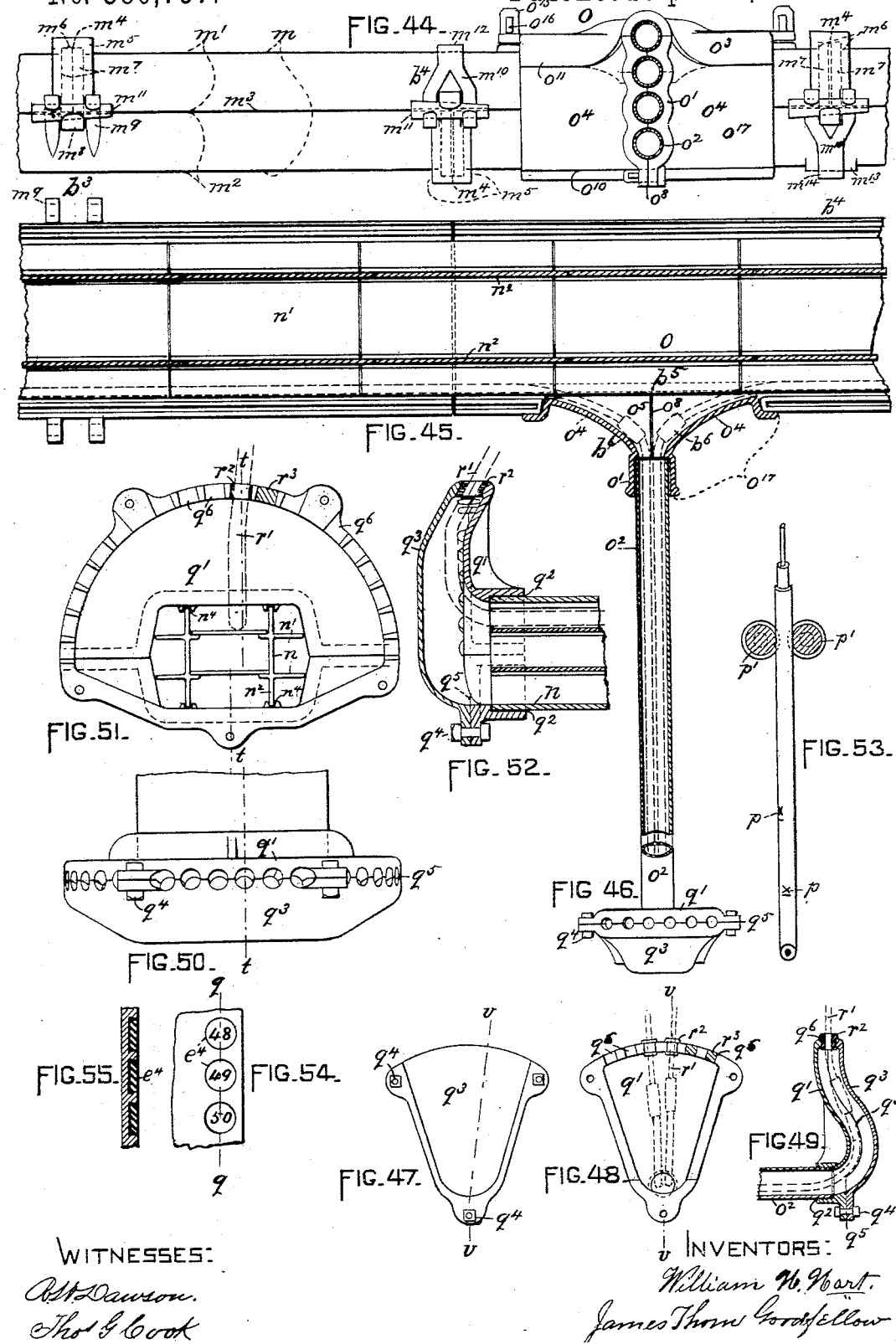

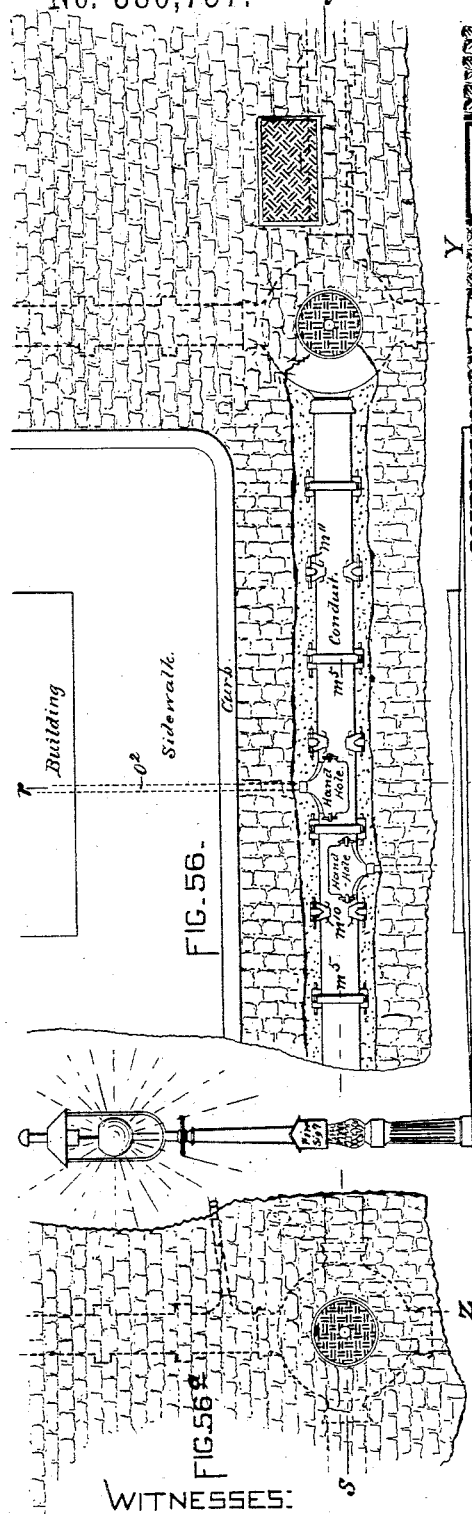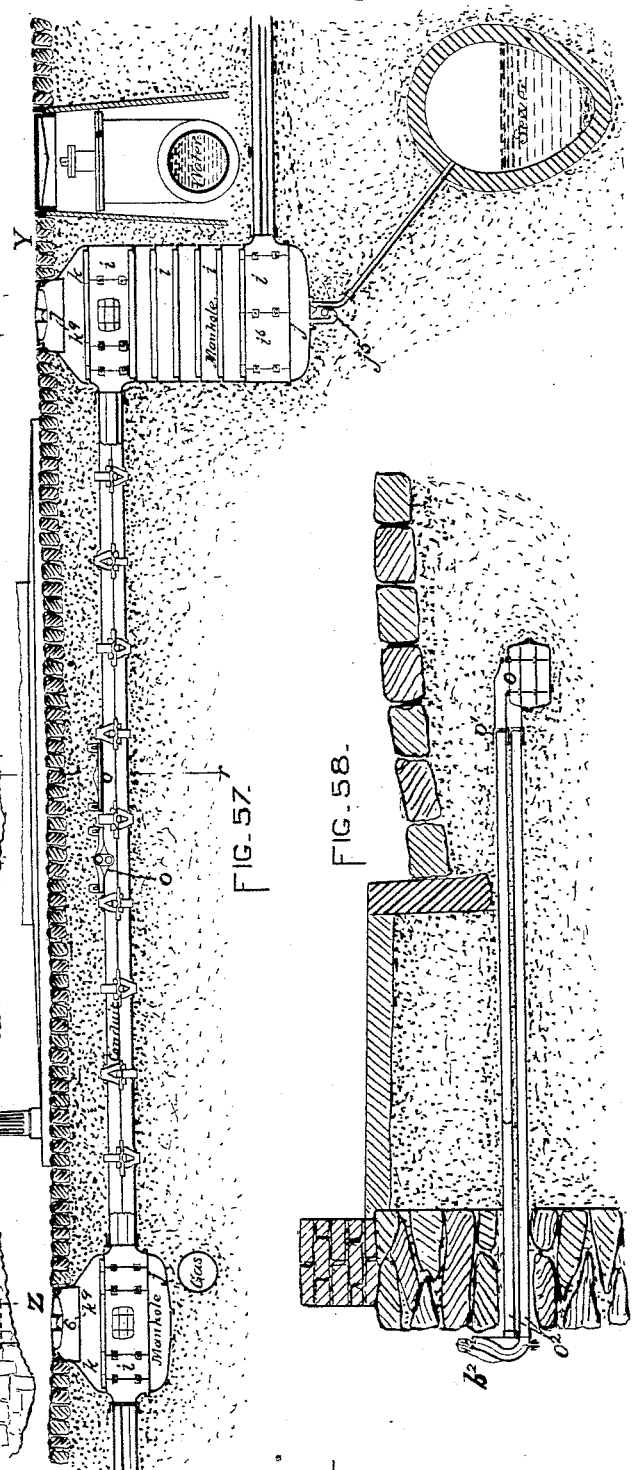

UNITED STATES PATENT OFFICE.

WILLIAM H. HART, OF BROOKLYN, AND JAMES THORN GOODFELLOW, OF TROY, NEW YORK, ASSIGNORS TO WILLIAM HAMPDEN JOHNSTONE, OF PHILADELPHIA, PENNSYLVANIA.

SYSTEM OF ELECTRICAL DISTRIBUTION.

SPECIFICATION forming part of Letters Patent No. 380,757, dated April 10, 1888.

Application filed March 3, 1887. Serial No. 229,657. (No model.)

*To all whom it may concern:*

Be it known that we, WILLIAM H. HART, of the city of Brooklyn, in the county of Kings and State of New York, and JAMES THORN GOODFELLOW, of the city of Troy, in the county of Rensselaer and State of New York, both citizens of the United States, jointly have invented certain new and useful Improvements in Apparatus for Distributing Electric Wires Underground, of which method and apparatus the following is a specification.

Our invention relates to the distribution of underground wires for the transmission of electrical energy from one or more central stations to a number of diverse localities or terminals for telegraphy, telephony, electric lighting, and, generally, for all the purposes to which electricity may be applied.

It consists of improvements in apparatus for distributing the cables and wires, in the conduits containing them, and in the man-holes which are interspersed at intervals along the lines of conduits.

By our improved system one or more wires may be taken from the cables at intervals in man-holes, or service branches between the man-holes, and the remainder of the wires may then be carried forward in a cable or cluster to the next point where they are to be divided, and so on continuously until all the wires are utilized.

In the accompanying drawings, Figure 1 represents diagrammatically several squares of street, beneath which, at various points, are located man-holes, work-chambers, or vaults connected one with another by means of conduits, as shown in dotted lines, and through which man-holes and conduits wires for the transmission of electrical energy are exhibited, in a general way, as being distributed from a central station to various terminal points. Fig. 2 illustrates, on an enlarged scale, the manner in which electric wires are united at a central station into a cable and thence carried from one man-hole to another and distributed, as shown in regard to one of the cables of wires shown in Fig. 1, and also showing means for designating the character, origin, route, and destination of such wires, which latter means are not claimed herein, as they constitute part of the subject-matter of another division of this application hereinafter specified. Figs. 3 and 4 illustrate various forms of tags employed in carrying out those features of this invention shown in Fig. 2. Fig. 5 represents a vertical central longitudinal section through a case for protecting the ends of wires of different cables at their points of union. Fig. 6 is a top edge view, and Fig. 7 an end view, of the same. Fig. 8 is a vertical central longitudinal section of a modified form of the device shown in Fig. 5, showing means for obtaining access to the ends of wires therein for purposes of testing, &c. Fig. 9 is a horizontal longitudinal section of the same. Fig. 10 is an edge view of the same. Fig. 11 is a transverse section of Figs. 8, 9, and 10 at the line $z\ z$. Fig. 12 is a vertical central longitudinal section of a modified form of the device shown in Fig. 8. Fig. 13 is a central vertical transverse section through one of our man-holes, in which is illustrated the application of certain features and devices shown in previous figures. Fig. 14 is a broken detached sectional view of a modification of the form of the wall of the man-hole shown in Fig. 13. Fig. 15 is a side elevation, and Fig. 16 an end view, of a rack adapted to sustain wires or cables adjacent to the upper and inwardly-inclined wall of the man-hole, as shown in Fig. 13.
Figs. 17 and 18 are respectively a side and an edge elevation of a rack for supporting wires or cables along the vertical walls of the man-hole. Fig. 19 is a vertical section of a part of a side wall of a man-hole, showing a modification of the device for supporting racks or hooks for wires or cables. Fig. 20 is a horizontal section through the man-hole shown in Fig. 13, taken on a plane through the conduit-connections and illustrating in dotted lines next to the side walls of the man-hole the location of wires or cables entering such man-holes from different directions and devices shown in Figs. 2, 5, 8, 12, and 13 as uniting such wires or wire cables. Fig. 21 is a section on the line $y\ y$, Fig. 20, of a portion of the wall of a man-hole. Fig. 22 is an outside elevation of the same. Fig. 23 is a horizontal section on the line *x x* of Figs. 21 and 22. Fig. 24 is a similar view to Fig. 23, the parts being detached from one another. Figs. 25 and 26 are views similar to Fig. 20, on a reduced scale, showing modifications in the arrangements of parts to vary the directions of entrances of conduits into the man-holes. Fig. 27 is a perspective view of a section of conduit, with portions thereof broken away, adapted to carry out certain features in our invention. Fig. 28 is a vertical transverse section of a conduit in modification of that shown in Fig. 27. Fig. 29 is a similar section of a conduit of greater capacity. Figs. 30, 31, and 32 are similar sections of conduits of successively smaller capacities to that shown in Figs. 27 and 28. Fig. 33 is an enlarged vertical sectional view of a portion of conduit at the longitudinal side joint of the upper and lower section thereof. Figs. 34, 35, 36, and 37 are perspective views of separate parts of clamping device adapted to secure the parts of the conduits together, as shown in Fig. 27. Fig. 38 is a side elevation of a portion of conduit, showing a modification in the means of making lateral connections therewith for lamp-post, house, or other electrical service. Fig. 39 is a plan view of the same, the cover thereof being removed. Fig. 40 is a vertical section on the line *w w* of Figs. 38 and 39. Fig. 41 is a detached vertical section of a removable part of the device shown in Fig. 40; Fig. 42, a similar sectional view of another of such parts. Fig. 43 is a similar section of a conduit as shown in Fig. 40, with the parts shown in Figs. 41 and 42 removed, the cover being so shaped as to meet the requirements necessitated by the change. Fig. 44 is a side elevation of a section of conduit, showing devices for making lateral connections of side branches therewith, as shown in Fig. 27, and also various modifications in devices for securing the parts of the conduit together. Fig. 45 is a central horizontal longitudinal section through the same, in which the manner of making connections with service-wires or wire cables from buildings, lamp-posts, &c., is illustrated in dotted lines. Fig. 46 is a top view of a terminal box to be used in making a terminal connection with a man-hole or conduit at a building or other place. Fig. 47 is a front view of the same. Fig. 48 is an interior view with the cover shown in Figs. 46 and 47 removed. Fig. 49 is a vertical section of the same on the line *v v* of Figs. 47 and 48. Fig. 50 is a top view of a conduit-terminal section at a central station, as indicated at *u*, Fig. 1. Fig. 51 is an interior elevation of the same with the cover removed. Fig. 52 is a vertical section on the line *t t* of Figs. 50 and 51. Fig. 53 represents a method of marking the enveloping coating or casing of insulated wires or cables. Fig. 54 shows a device for numbering wires or cables, as hereinafter described. Fig. 55 is a section of the device shown in Fig. 54 at the line *q q*. Figs. 56 and 56ª represent a plan view of a portion of a street with man-holes, connecting-conduits, hand-holes, and side connections located thereunder, and showing a trench opened, so as to afford a top view of several sections of conduit therein. Fig. 57 is a vertical section of the same on the line *s s*, Figs. 56 and 56ª. Fig. 58 is a cross-section of the same, on an enlarged scale, at line *r r*, Figs. 56 and 57.

The intent of the figures on this sheet (Sheet 8) is to show the relation between the man-holes represented in Sheets 1, 2, 4, and 5 and conduits and lateral terminal connections in Sheets 1, 6, and 7, and to meet certain exigencies which may arise in the laying of subterranean trunks or conduits for electric wires beneath the streets of cities.

Since the advent of the telephone, electric light, news and stock tickers, and fire, police, and messenger call service in cities aerial electric wires have multiplied to such an extent as to become a serious menace to the safety of life and property and interfering with the proper service of fire-departments. A number of devices have been heretofore proposed looking to the placing of such wires beneath the streets of cities; but the problem has presented so many difficulties to its complete solution that all the progress desired in this direction has not yet been made.

Our invention is the result of long experience and many experiments covering several years, and its aim is to remedy the above-mentioned and other difficulties.

One feature of our construction is the location of man-holes beneath the surface of the street at convenient distances apart, connected by conduits having one or more compartments extending longitudinally therein from man-hole to man-hole, and adapted to have drawn therethrough from one man-hole to another electric wires or wire cables, as required, without opening or digging up the street.

In the drawings, *a'* refers to cables of electric wires which in Figs. 1 and 2 are represented as passing from a central station into a man-hole or working-chamber, No. 1. This man-hole is connected with the central station by means of short sections of conduit through which the cables pass. From man-hole No. 1 the cables pass through conduits to other man-holes, No. 2 and No. 9, Fig. 1, and thence through conduits to other man-holes, and so on, as may be required.

Owing to the fact that the space beneath many of the streets of large cities is so much occupied by gas and water mains and sewers and their lateral service-connections with buildings, very little available space is left for any system of underground conduit. In order that the conduits may, therefore, be made as small as is consistent with the accommodation of a maximum number of wires, it has been found advisable to concentrate the wires with their insulating covering, so far as practicable, in cable form. With the view of protecting such wires and cables from moisture they are protected with a covering impervious thereto.

Lead tubing constitutes, as is well known, a good covering. (See Figs. 7, 13, and 27.) This covering, in addition to its being moisture-proof, also, by reason of its flexibility, makes the cable easy to handle. The lead composing the covering also affords a means for dissipating induced electricity among wires in conduits. Such a cable one and three-fourths inch outside diameter can be made to contain three hundred and fifty wires adapted for telephonic use. The sizes of cables and the size and number of wires contained therein must necessarily depend upon the purpose for which they are to be employed. (See Fig. 27.) Some wires, of necessity, are larger than others.

In the distribution of electric wires from a central station to different terminal locations in various directions and at varying distances the connections between such central station and terminal points are made as occasion arises for the use of the wires.

The cables $a'$ are carried through a succession of man-holes and connecting conduits to a man-hole where it is desired that wires should diverge in several directions, and thence in cable form to other man-holes, or, if desired, to connect with single insulated wires, as indicated in Figs. 1, 2, 13, and 20, for terminal points between two consecutive man-holes.

In Fig. 2 is shown our method of distribution in relation to one of the cables whose central-station terminal is marked A, Fig. 1. The several wires at the central station are united into a cable, $a'$, by means of a terminal case, $a$, thence carried through man-hole No. 1 to man-hole No. 2, where its end is electrically united to two cables, $a^2\ a^2$, entering such man-hole No. 2 from two different directions. Four several single wires, $a^4$, of cable $a'$ are terminated at this man-hole for local use in the vicinity. The sum of the wires $a^4$ and those in cables $a^2\ a^2$ in man-hole No. 2 is equal to the number of wires in cable $a'$. The wires in one of the cables $a^2$ are carried from man-hole No. 2 to man-hole No. 3, where the wires of such cables are electrically united with the wires in three separate cables, $a^3$, entering such man-hole from three different directions, and three several single wires, $a^4$, are also united with wires from such cable $a^2$. Such single wires are taken out or terminated there for use in the vicinity of man-hole No. 3. One of the cables $a^3$ is extended to man-hole No. 7, where it ends and is united to several single wires $a^4$, branching from such man-hole in three different directions to be distributed to their respective terminal points for use in the vicinity of man-hole No. 7. The inclosing-case $a$ of cable terminal $a'$ at main or central station is made in two parts. The front, which we call the "cover," is secured to the back part by bolts or their equivalent, substantially as shown in Fig. 2.

The plan of distribution described with regard to the cable beginning at A in Fig. 1 is also pursued with those starting at B C D, &c., Fig. 1.

It is designed that trunk-lines shall, as far as is practicable, be confined to cable form; but, while a cable may terminate at a man-hole, the single or separate wires may be conducted in the conduits to their various terminals.

One or more single wires from ends of cables, as shown at man-hole No. 2, Fig. 2, may be left for future connections for local distribution in the vicinity of such man-hole when desired. When necessary, such local connection may be made from a man-hole through a tube therefrom into a building, as indicated at $b'$, man-hole No. 9, Fig. 1.

By the termination of single wires and cables at man-holes and there connecting them to others certain fixed and convenient points are afforded for examining such wires and their connections, and the tracing of the route of the wires or cables from one terminal to the other is also facilitated. By connecting a cable at a man-hole with two or more other cables each having fewer wires, or with a single wire or wires and a cable or cables not together exceeding the number of wires in the main cable, the occurrence of dead-wires is avoided. Dead-wires confuse the workmen and occupy space unnecessarily.

One of the difficulties encountered in the protection of underground electric wires in conduits and man-holes is to exclude moisture therefrom. Even where every precaution is taken to make the conduits and man-holes tight water will enter by the joints of the covers of man-holes during heavy rain-storms or during thaws, also when the covers are removed for the purpose of giving workmen access to them at certain seasons of the year when the interior of man-holes is cooler than the external air, and in such cases moisture in the air which enters the opening will deposit on the interior of the man-holes and conduits and objects contained therein. To avoid the evil effects of this moisture upon the wires, we have devised a means for their protection, which consists not only in incasing the wires and wire cables in the conduits in a moisture-proof covering, $a^5$, but also in inclosing the joints of such wires and cables in the man-holes in water-proof covering, as shown in Sheets 2 and 3.

In Figs. 5, 6, and 7 the connections of the wires from cable $a'$ with the single wires $a^4$ and those in cables $a^2$ are shown in a casing, $c$, the parts of which are secured together by means of bolts or their equivalents in such a manner as to preclude the admission of moisture. Though the parts $c^2\ c^3$ of casing $c$ may be made of any suitable material and in any desired form, we prefer cast-iron in the forms substantially as shown. When the joints $c'$ between the parts of the casing and joints $a^6$ between the casing $c$ and the covering $a^5$ of the wires or cables are not water-tight, such joints $c'\ a^6$ may be made tight with suitable packing or luting.

In order to prevent the joined wires from coming in contact with other joined wires in the casing $c$, they are covered with some fibrous insulating material, and, if desired, the space between such covered wires may be filled with melted paraffine or other suitable insulating material. This insulating material may be poured in through orifices $c^4$ in the casing. The casing is removably secured to the ends of connecting-cables, so as to permit of ready removal therefrom for the purpose of gaining access to the connections of the wires of such cables.

In Figs. 8, 9, 10, and 11 the connecting-casing $d$ is modified in form and has incorporated therein certain features in addition to those set forth in Figs. 5, 6, and 7. In the latter figures the wires from the cable are spread out and pass through insulating-bushings $d'$ and terminate in spring-clips $e$, set in recesses formed in a plate, $e'$, of hard rubber, vulcanized fiber, or similar insulating material. The wires, either singly or in cable form, entering the casing $d$ from the opposite direction, pass through bushings $d'$ in the same manner and terminate in clips $e$. Electrical connection is established between wires terminating in clip-pieces $e$ by means of metallic strips $e^2$, adapted to be inserted therein between the ends of wires. In this device the end of a cable is united with the end of another cable or cables or single wires, or both single wires and one or more cables, as the case may be.

In order to prevent electrical contact between the cover $d^4$ and any of the wire terminals $e$, we propose to face the inner surface of cover $d^4$ with insulating material, $e^3$.

The joints $d^5$ between the parts of casing $d$ and the casing $a^5$ of the wires or cables therein are made in the same manner as is described in relation to the case $c$ and its wires and cables, Figs. 5, 6, and 7.

Fig. 12 illustrates a modification of the device shown in Fig. 8. In Fig. 12 single wires are connected by means of a casing, $f$, to wires in a cable, and the ends of such single wires are shown inserted between spring-clips $e$.

We do not confine ourselves to any specific device for making detachable connections between the terminals of wires in the casings $d\,f$. The device substantially as shown in Figs. 8 and 12 is preferred on account of the smallness of space occupied by the same.

By removing the covers $d^4$ and $f''$ (see man-holes Nos. 3 and 7, Figs. 2 and 13) ready access can be had at any time to any one or more of the wire-connections in such cases without disturbance of other wire-connections therein whenever desired.

In Fig. 13 and by dotted lines in Fig. 20 cables and wires and the connecting-cases $c\ d\ f$ are shown placed flatwise next to the side walls of the man-hole, so as to leave a free space in the interior of the man-hole for working purposes in introducing wires or cables in the conduits branching from such man-hole or removing the same, or doing such other work as may be desired in such man-hole. The cases $c\ d\ f$ are shown provided with eyes $g$, or their equivalents, as means by which such cases are suspended in place next to the side walls of the man-hole, substantially as shown by rods $g'$, Fig. 13.

In adapting a man-hole to carry out the foregoing plans of distribution of electric wires it is essential that such man-holes shall possess certain peculiar features, among which is that ample space shall be provided in such man-holes for the disposal of wires and cables along its walls, and at the same time afford sufficient room for working purposes in the manipulating and disposal of such wires and cables; also, that means shall be provided for supporting such wires and cables in their places therein.

Owing to the limited amount of space that is frequently afforded in streets among gas, water, and other pipes and their intersections, the man-holes, while affording sufficient room therein, should be so constructed as to occupy as little space in the street as practicable.

In building man-holes of brick masonry the walls must be at least eight inches thick, thus making the external dimensions at least sixteen inches greater than the internal. With a view to economy of space in the street, saving of time in erection, imperviousness to moisture, aiding in the grounding of induced currents, &c., we preferably construct the manholes of metal.

Though the man-holes are by preference shown in the drawings, Figs. 1, 20, 25, 26, 56, and 56ª, as circular in form, we do not confine ourselves to that shape. The side walls of the man-holes, as shown in Figs. 13 and 59, are made up of sections $i$, the lower edge of each section resting upon the upper edge of the section next below it. By this construction man-holes of sections or rings of such width as may be desired are placed one above the other. The depth of such man-holes can be varied according to the requirements of the occasion. (See dotted lines in Fig. 13.)

The bottom plate, $j$, of the man-hole is provided with a seat, $j'$, for the edge of the vertical section resting thereupon, this plate $j$ being preferably made in one solid piece and saucer-shaped, having the outer portion, $j^2$, of such bottom plate concavely curved, so that when cables are carried from one conduit down the side wall of the man-hole, across the bottom thereof, and up the opposite side wall of such man-hole to another conduit (see Figs. 1 and 13) the cable is not liable to injury by being forced into a sharp angle. The upper edge of the saucer-shaped bottom $j$ is provided with an inward offset or flange, $j^3$, to form a support for the periphery of a removable false bottom, $j^4$, Fig. 13. This false bottom serves to protect such cables as may be placed beneath the same from injury by the feet of workmen.

It is obvious that by the use of the bottom of the man-hole for the support of cables, as well as the side walls thereof, the available space for accommodation of wires and cables passing through the man-holes is materially increased.

The false bottom $j^4$ may be perforated or made in open-work in such a manner as not only to permit water to pass through the same, but to enable the workman to readily trace any of the cables beneath the same passing from one conduit to another across the bottom of man-hole.

The depth of man-holes and the distance between the conduits entering such man-holes and the floor thereof should be such as to afford the fullest convenience to the workmen therein to perform such work as may be required of them, especially in inserting or withdrawing wires and cables from conduits.

Certain exigencies may arise it which it may be necessary to vary the depth of the man-holes—for instance, (see at Z in Fig. 57,) when a gas, water, or other main is so near the surface of the street at the locality where it is sought to locate the man-hole as to necessitate making the latter somewhat shallow. This is done by setting in ring-sections $i$, each of less vertical depth, to clear the obstruction, or using a less number of the rings in setting up the man-holes. In case some obstruction (see Y, Fig. 57) occurs in the street, whereby it may become necessary to lay the conduit for a short distance at a greater depth than usual in order to pass such obstructions, we propose by increasing the depth of the rings used or their number, or both, to carry the man-holes to the required depth to enable the conduit to pass beneath the obstruction.

The hubs $i'$, Fig. 13, which we preferably construct in one and the same piece with the side wall of the man-hole, project outward and are of such shape as to receive the ends of conduits diverging from such man-hole in such a manner as to permit the space $i^2$ between the interior of such hubs and the exterior of the ends of the conduit therein to be calked in a manner similar to that of bell and spigot joints of water or drain pipes.

The entrances of the man-holes into the conduits are such as to conform at $i^3$ to the interior of the conduit-case, and thence are curved convexly inward, so as to form a bell-mouth, $i^4$, for the purpose of avoiding passing the cables and wires over a sharp angle in passing from the side walls of man-holes into the conduit. The hub $i'$ may be made, as indicated in dotted lines at $i^5$, Fig. 13, at the joining of two sections of the man-hole, a part of such hub being formed on each of such sections, or, as shown in full lines of same figure, wholly on one of the sections. The sections $i$ may be made in one continuous piece or divided into segments or parts $i^6$, as may be desired.

For the purpose of securing the parts of segments $i^6$ into a whole continuous section, $i$, we provide the vertical adjoining edges thereof with ribs $i^7$, preferably on the outside, adapted to receive therein rib-embracing clamp-bars $i^8$, with channel $i^9$ therein, such clamp-bar $i^8$ being secured in thin places on the ribbed edges of the segments $i^6$ by means of bolts $i^{10}$ and nuts $i^{11}$, substantially as shown in Figs. 20, 21, 22, 23, and 24. The ends of the clamp-bars $i^8$ are permitted to project a short distance beyond the upper and lower edges of the sections upon which they are secured, so as to cause those edges to coincide with the edges of adjoining upper and lower sections $i$.

Among the advantages of constructing the sections $i$ in segments $i^6$, especially such sections as contain the hubs $i'$, is that one or more of such segments $i^6$ can at any desired time after the man-hole is set up be removed from its place and another segment or segments, either plain or provided with hub $i'$, be substituted therefor without disturbing the other sections of the man-hole. As the construction of man-holes in a system of wire distribution will frequently require different sizes and location of hubs thereon, this manner of constructing such sections $i$ of man-holes will permit making a supply of segments $i^6$, provided with the different sizes and arrangement of hubs $i'$, and putting them in their proper places as the man-hole is set up. (See Figs. 20, 25, and 26.)

Although for convenience of inserting and withdrawing cables and wires from conduits at the man-hole it is preferred that such conduits shall be in line with the center of the man-holes, still some obstruction—such as gas or water pipes or their valves—in streets may prevent the conduit from so centering with the man-hole. In such case the hub may be set to one side of the vertical center line of the man-hole, as indicated at $i^{12}$ in Fig. 26 and dotted lines, Figs. 20 and 25, so as to be, in effect, tangential instead of radial.

For the purpose of making a joint at the meeting of the sections $i$ of the man-hole we propose to turn up a flange on the upper external edges of the sections, as shown at $i^{13}$, Fig. 14, or on the inner upper edges thereof, as shown in Figs. 13 and 57, so as to receive the lower edge of the superimposed section. We then fill or partly fill the space between the flange $i^{13}$ and the surface at the lower edge of section $i$ with pitch or other luting. The upper section, $k$, of the man-hole is contracted at its top, so as to form what we term a "taper top," and provided with a seat, $k'$, for the reception of the lid $k^2$, (see Figs. 13 and 57,) which is secured in its place by means of a horizontal bar, $k^3$, provided with bolt $k^4$ and nut in recess $k^5$, the ends of which bar $k^3$ are inserted in sockets $k^6$ in the neck portion $k^7$ of the upper section of man-hole.

For the purpose of draining the man-holes of any water entering the same we place in the bottom of such man-holes traps $j^5$, leading to a drain or sewer, so constructed and arranged as to permit water to readily flow out of the man-holes, but to prevent any backflow into the man-hole, substantially as shown in Figs. 13 and 57, in which a ball-trap of well-known form is shown.

For the purpose of supporting racks for sustaining wires or cables passing through manholes next to the side walls thereof we propose to construct and arrange the internal flanges, $i^{13}$, at the upper edge of sections $i$, so as to permit the racks $l$ or $l^3$ to hook over the same, substantially as shown in Fig. 13. Should it be desired, these edges or flanges may be formed on the bottom edge of sections $i$, as shown in Fig. 14 at $i^{14}$. The flange $i^{13}$ at the bottom of the inwardly-contracted or cone-shaped section $k$ serves to receive the foot of the rack $l$, Figs. 13, 15, and 16. The upper portion of the section $k$ is provided with an internal downwardly-projecting flange, $k^8$, serving as a support for the upper end of the racks $l$. This flange $k^8$ also serves as a drip-guard for water that may find its way through the mouth of the man-hole from the surface of the street, and to prevent the flowing of such water, with mud, down the side walls of the man-holes and upon cables and wires sustained along its walls.

The racks $l$ over the entrances to conduits are so arranged that their tops shall meet and their feet shall be spread apart sufficiently to be adapted to receive the wires and cables from such conduits. The wires or cables are thence carried by other racks next to the sloping sides of the section $k$ of the man-holes. The spreading apart of the feet of those racks over the conduit-entrance is prevented by means of the connecting bar $l'$, secured to the feet of these racks. This bar $l'$ also serves as a support for wires or cables extending from the racks $l$ to the conduits beneath and prevents their sagging away from the side of the man-hole, as shown at $l^2$, Fig. 13.

The inwardly-projecting flanges, $i^{13}$, Fig. 13, or $i^{14}$, Fig. 14, are preferably made solid and in one piece with the sections $i$ of the man-hole, and so as to afford convenient facilities for supporting-racks $l^3$, Figs. 13, 17, and 18, for sustaining wires and cables thereon next to the vertical side walls of the man-holes.

The term "man-hole" used in this specification and the claims refers, broadly, to the case inclosing the same, including sides, bottom, and top.

The conduit which we have devised in connection with the hereinbefore-described man-hole for carrying out our invention is made up of an external casing generally provided with internal division-plates, $n$, so arranged in connection with the casing $m$ as to form longitudinal compartments therein extending from man-hole to man-hole. The casing of the conduit is shown in Figs. 27, 28, 29, 30, 31, 32, 40, 43, 44, 45, 56, 57, and 58, as made in two trough-shaped plates, $m'$ $m^2$, so shaped that when they are joined together edge to edge they form a conduit approximately rectangular in cross-section. These plates are united, so that when they are in their place in the trench (see Figs. 44, 56, and 57) their longitudinal joints $m^3$ are at their sides and the end joints, $m^4$, of one section on one side shall brake joint with those on the opposite side.

One of the objects of making the longitudinal joints at the sides of the conduit in contradistinction to top and bottom is to enable the workman to secure the parts of the conduit-casing together with greater ease and certainty.

We find that the conduit-sections made about five feet in length are convenient for the workmen to handle in putting the same together in the trench.

The clamp pieces $m^5$ conform to the shape of the sections of conduit. These clamps are shown provided with recesses $m^6$ therein of such depth, width, and shape as to conform to and embrace the end flanges or ribs, $m^7$, on the two adjacent ends of section $m$. (See Figs. 27, 35, 44.) The ends of these clamps are provided with hooks $m^8$, adapted to engage with hooks $m^9$, either made in one and the same piece with the body of opposite sections of conduit-case, as shown at $b^3$, Figs. 44, 45, or to engage with hooks $m^9$ on detachable straps $m^{10}$, Figs. 27, 44, by means of a tapering or wedge-shaped pin, $m^{11}$. The straps $m^{10}$, with engaging hooks on opposite sides of conduit, may be made in one piece, as indicated at $m^{12}$, Fig. 44, and in dotted lines, Figs. 27 and 36; but we prefer to provide the back of sections of conduit midway between their ends with cleats $m^{13}$ and the straps $m^{10}$ with hooks $m^{14}$ thereon, adapted to engage with cleats $m^{13}$ in such manner as to assist in securing the parts of conduit together by means of straps $m^5$ $m^{10}$ and pin $m^{11}$, substantially as shown in Figs. 27 and 44.

The lateral longitudinal joints $m^3$ of the conduit are shown (see Fig. 33) as formed with a tongue and groove, the tongue being by preference in the upper half-section, $m'$, and the groove in the lower half-section, $m^2$, of conduit and having a space between the tongue and groove for luting. By filling the groove at the joints $m^3$ of the conduit and the recess $m^6$ in clamp $m^5$ with luting, and by means of the tapering pin $m^{11}$, inserted and driven home in its place between hooks $m^8$ $m^9$, we secure the parts of the conduit together. The joint thus formed is made water-tight both at the sides and the ends of such sections of conduit.

The employment of bolts and nuts in underground work—such as securing sections of conduit together—is objectionable, because the threads of such bolts and nuts will rust together so firmly as to defeat their ready removal. By the use of our device of hooks $m^8$ $m^9$ and pin $m^{11}$ (which pin we preferably make of cast-iron) it is an easy operation to disengage the parts from each other.

In the conduits the longitudinal compartments are rectangular, or approximately so, in cross section, formed by means of divisions $n$, composed of horizontal and vertical plates $n'$ $n^2$. These compartments serve to keep the different classes of wires and cables separate from each other, and also to lend additional strength to the casing of the conduit against the pressure of the surrounding earth. The division-plates $n$ are susceptible of considerable modification in arrangement and construction of parts $n'$ $n^2$, both in relation to themselves and to the casing of the conduit.

By forming the interior surfaces of the conduit-casing $m$ with ledges $n^3$ on the sides and grooves $n^4$ in the top and bottom (see Fig. 27) a wide range in modification of arrangement and form of division-plates $n$ is admissible. If it should be desired to convert the three lowest compartments in Fig. 27 into one, the lower division-plate could be made without its vertical members $n^2$, so as to permit its outer edges to rest upon the lower ledges $n^3$, or, if it should be desired to construct this plate with but one downwardly-extending strip $n^2$, such member could be retained in its place in groove $n^4$, while either one or both of its edges could be supported on ledge $n^3$, so as to prevent the horizontal part of the plate from tilting. If it should be desired to convert the uppermost three compartments of the conduit, Fig. 27, into one by the omission of the vertical plates $n^2$ thereof, the upper ledges, $n^3$, of the side of the conduit will prevent the upper horizontal division-plate $n'$ from tilting upon its downwardly-extending strips $n^2$ by reason of any load that may be placed on one of its outer edges.

When the vertical strips $n^2$ of division-plates $n$ have detachable contact with the horizontal plates or with the top and bottom internal surfaces of the conduit, it is preferable to provide grooves $n^4$ $n^6$, or their equivalents, for the reception of the free edges of such vertical parts of division-plates, especially if such vertical members of plates are made of thin metal.

Although we show various modifications in the construction and arrangement of the parts $n'$ and $n^2$ of division-plates $n$, Figs. 27, 28, 29, 30, 31, 32, 40, and 51, we prefer, when practicable, to construct them in the form of trays, or, in other words, a horizontal plate, $n'$, with vertical plates $n^2$ in one piece, and they are arranged in the conduit-casing in such a manner that (when there are two or more) one will rest upon the other, substantially as shown in Figs. 27, 28, 29, and 40.

In a conduit constructed as above described it is obvious that if, from any cause, it should become necessary to remove and replace, wholly or in part, a conduit and its division-plates it can be done without disconnecting any of the wires or cables or in any manner disturbing the electric service thereof for such purpose. We consider this feature of our invention of great importance, especially in repairing damages to the conduit or in replacing a stretch of conduit between two man-holes by one of different capacity.

With a view to the local distribution of wires from a man-hole through a conduit to various points along the line of such conduits, we provide such conduits with hand-holes $o$, for making lateral branch connections at such intervals as may be required. (See Figs. 27, 38, 39, 40, 43, 44, 45, 56, 57, and 58.)

In the system of distribution of electric wires herein described we designate the lines as of two classes—viz., those that pass from one man-hole to another without interruption, which are called "through-lines," and those which pass from a man-hole into a conduit and are thence carried by means of a side connection to a lamp-post, building, or other structure, where they terminate, which we call "local lines." When a wire passes uninterruptedly from a central station from man-hole to man-hole, it is called a "through-line," and when it passes from a man-hole into a conduit from which it is carried to its termination it is called a "local wire." In the conduits certain compartments are set apart for the accommodation of through-lines and certain other compartments, preferably the ones next to the upper side of conduit-casing, are employed for local wires.

In Figs. 27, 39, 40, 45, 58, $o'$ refers to hub-sockets adapted to receive the ends of lateral branch connections $o^2$, preferably made of gas-pipe, between the conduit and building, Figs. 56 and 58. The joints between the end of pipe $o^2$ and hub $o'$ are made tight with luting or other suitable material to prevent the admission of water thereat. To avoid disturbance of the pavement as much as possible in making lateral connections with the conduit, when practicable a hole is bored through the soil with a tool adapted to the purpose from the cellar or vault of a building to the place for making side connections. We then insert the pipe $o^2$ in the hole thus made and make the joint, as above described, with hub $o'$ on the conduit.

The hand-holes $o$ are provided with removable covers $o^3$, to enable the workman to gain access to that portion of the conduit in making lateral connections with wires thereat.

With a view to increasing the space in hand-holes $o$, to facilitate making lateral connections and to afford a gradual turnout or casement for wires in passing from a side compartment of conduit into lateral connections, the side walls of the conduit are flared out upon a gradual curve to the hub $o'$. This avoids the necessity of making a sharp angular turn with the wire.

It frequently occurs, as in electric arc lighting and some other electrical service, that a side connection with a wire already in the conduit and passing a hand-hole is desirable. In this case, by severing such wire at $b^5$ (see Fig. 45) and uniting the severed ends of such wire, as indicated at $b^6$, with the ends of other wires introduced from side pipe, $o^2$, the service-connection is made. The outwardly-curved side walls, $o^4$, of conduit at the hand hole $o$ for lateral service form a recess into which the joints ($b^6$, Fig. 45) made with lateral wires are drawn out of the path of other wires in the conduit. The plates $o^5$ in the recesses formed by walls $o^4$ are so arranged as to form a continuation of the horizontal plates $n'$ of the conduit. These plates $o^5$ are preferably made solid and in one piece with the vertical walls $o^4$ of the recess.

To carry wires from an upper middle compartment to a lateral connection, the bridge-plate $o^6$ spans from the top edge of a vertical partition $n^2$ to the hub $o'$, (see Figs. 27, 39, and 40,) and the cover $o^3$ is so shaped that in connection with the bridge $o^6$ it forms an inclosed passage for such wires at $b^7$, as shown in Figs. 27, 39, and 40.

For the purpose of readily disconnecting the hubs $o'$ from the end of connecting-pipes $o^2$ when required, such hubs are made so as to open in two parts, either horizontally, as shown at lines $o^8$ in Figs. 38, 40, and 43, and a portion of the hub $o'$ being in this case made solid and in one piece with the conduit-casing, or vertically, as shown in Figs. 27, 44, and 45. In Figs. 27, 44, and 45 the hub-section $o^{17}$ is removably connected with the side of the conduit, so that when the conduit is first laid in the trench the place for lateral connection is covered with a plate, $o^9$, so constructed that its inner surface will form a straight line with the inner surface of the conduit-case, and when it is desired to make a side connection with the conduit at such place the plate $o^9$ is removed and the hub-pieces $o^{17}$ substituted therefor. The lower edge of the hub-piece $o^{17}$ is held in place by means of a tongue inserted in a groove, $o^{10}$, forming part of the lower section of the conduit. The upper edge of plate $o^9$ and hub-pieces $o^{17}$ in Figs. 27 and 44 is held in place by means of the overhanging edge $o^{11}$ of the cover $o^3$.

Any particular compartment or compartments in the side or top, or both, of the conduit may be provided with outlets for any lateral service that may be desired.

It is obvious that in cases where the cover $o^3$ forms part of the hub-connection $o'$ its shape and construction must necessarily be modified to suit the occasion.

In Figs. 27 and 40 is shown the form $o^3$ of cover used when wires are taken from a middle upper compartment, and Fig. 43 shows a modification in the form of cover $o^3$, Fig. 40, adapted to form a part of hub $o'$, connecting with an upper side compartment when the parts $o^6 o^{12}$, Figs. 41 and 42, are omitted or removed from Figs. 38 and 40. The joint $o^{13}$ between the covers $o^3$ and the rim $o^{14}$ of the opening of hand-hole $o$ is formed by means of a tongue and groove adapted to be luted against the admission of water thereto. The covers are shown secured in place by means of eyebolts $o^{15}$ and keys $o^{16}$.

When practicable, we provide the ends of lateral connections as they project through the walls of buildings (see Fig. 58) with terminal boxes. (See Figs. 46, 47, 48, 49, 50, and 52.) For convenience of access to the interior of such a terminal box we make it in two parts, one of which, the rear part, $q'$, is secured to the end of the pipe $o^2$ or conduit end in any suitable known manner, substantially as shown at $q^2$ in Figs. 49, 51, and 52. The other part forms a removable cover, $q^3$, secured to part $q'$ by means of bolts $q^4$, or their equivalent. The joints $q^5$ are made tight with luting or other packing.

With a view to making the passages gas and water tight about wires or cables $r'$, we place a collar, $r^2$, preferably made of some insulating material, about such wire or cable to act as a bushing when such wire or cable leaves the terminal box. In case there are more orifices or passages $q^6$ than is required for the accommodation of wires or cables passing through such terminal box, they may be stopped by means of plugs, as shown at $r^3$, Figs. 48 and 49. The terminal box shown in Figs. 46, 47, 48, and 49 is substantially the same as that designed for terminals at points of distribution. (See at $b^2$, Figs. 1 and 58.) The terminal shown in Figs. 50, 51, and 52 is essentially the same as that indicated at $u$ in Fig. 1 for the purpose of receiving cables A B C, &c., passing from the central station through short sections of conduit into man-hole No. 1.

It is evident that by means of the above-described terminal boxes in case of flooding of the man-holes and conduits water cannot enter the buildings, and also that foul air or vermin is prevented from entering conduits and man-holes from buildings or gaining access by way of lateral connections to buildings from the conduits.

We do not broadly claim herein the method or apparatus described for branching the cables or for indicating their character, origin, route, and designation, as these constitute the subjects-matter of another division of this application, filed February 9, 1888, Serial No. 263,473.

Having thus fully described the construction and operation of our new and improved system of distribution of underground electric wires and apparatus therefor, what we claim therein as of our invention, and desire to secure by Letters Patent of the United States, is—

1. The flat flaring longitudinally-divided detachably-connected casing $a$, constructed, as set forth, to clamp and condense the wires as they enter the cable.

2. The combination of the conduits, the man-holes interposed at intervals therein, the main cable of separate wires passing therethrough, and the flat flaring longitudinally-divided casing $a$, attached to the cable to bunch or condense and clamp the wires as they enter the cable, as set forth.

3. The flat flaring flanged longitudinally-divided detachably-connected sectional casing $c$, interposed between the main and branch cables, and in which their connections are formed, as set forth.

4. The combination of the conduits, the man-holes interposed at intervals therein, the main cable of separate wires passing therethrough, the flaring sectional casing connected with the main cable, and the branch cables united with the sectional casing in the man-holes and connecting in the casing with the main cable, all organized and operating as set forth.

5. The combination of the conduit, the man-holes interposed at intervals therein, the main cable of separate wires passing therethrough, the longitudinally-sectional casing $c$, connected with the main cable, the branch cables united with the sectional casing in the man-holes and connected in the casing with the main cable, and the insulating-packing, all organized for joint operation, as set forth.

6. The combination, substantially as herein set forth, of the casing, the wires having their terminals therein, and the interposed connecting spring-clips uniting their respective terminals.

7. The combination, substantially as herein set forth, of the conduits, the man-holes interposed therein, the sectional casing (having packed joints) connected with the conduits in the man-holes, the main cable entering the casing, branch cables entering the same casing, and detachable connections uniting the terminals of the main and branch cables.

8. The combination of the conduits, the man-holes interposed at intervals therein, the main cable of separate wires passing therethrough, the sectional casing $c$, interposed between the main and branch cables, and similar casings, $d$, interposed in the branch cables in the same man-hole, these members being organized for joint operation, as set forth.

9. The combination of the conduits, the man-holes interposed at intervals therein, the main cable of separate wires passing therethrough, the sectional casing $c$, interposed between the main and branch cables, sectional casings $d$ in the branch cables, and detachable connections between the terminals in the latter, as set forth.

10. The combination of the sectional casing $d$, the wire terminals therein, the insulated bushing, the spring-clips, and the detachable connecting-pieces, all organized for joint operation, as set forth.

11. The flanged sectional casing through which the wires pass, constructed, as described, with hooks or eyes by which to suspend it close to the walls of the man-hole.

12. The combination, substantially as herein set forth, of the conduits, the man-holes interposed therein, the cables passing therethrough, the casing in which the terminals of the wires are connected, and the connections which suspend the casing in the man-hole.

13. The combination of the conduits, the man-holes interposed at intervals therein, the cables, the sectional casings through which the cables pass, the suspending-racks in the man-holes, and the connections by which the casings and cables are suspended, as set forth.

14. The combination, substantially as herein set forth, of the conduits, the man-hole, its inwardly and upwardly projecting ledge, and the cable-racks supported thereby.

15. The combination, substantially as herein set forth, of the man-hole, its supporting-ledges, a bracket or rest projecting downwardly from the roof of the man-hole, and cable-racks interposed between the rest and ledge.

16. The combination, substantially as herein set forth, of the man-hole, its supporting-ledges, a bracket or rest projecting downwardly from the roof of the man-hole, cable-racks interposed between the rest and ledge, and a brace or cross-bar connecting the racks, for the purposes described.

17. The combination, substantially as herein set forth, of the tapering top of the man-hole, its depending flange or drip-ring, and the cable-racks.

18. The man-hole constructed, as set forth, of rings composed of detachable segments to permit of the removal of any portion of any segment desired.

19. The man-hole constructed, as set forth, of separable segments and hubs provided with flanges of uniform size with the separable segments to enable one to replace the other.

20. The man-hole constructed, as set forth, with a tapering, conical, or contracted top or opening, with a depending flange or drip-ring encircling said opening to protect the man-hole and contents from moisture.

21. The combination of the conduits, the sectional man-holes interposed therein at intervals, exit-traps and valves in the bottom section of each man-hole, removable perforated false bottoms resting on the flanges of the bottom sections of the man-holes, and cables of separate wires passing through the conduits and man-holes and up through the false bottoms, as set forth.

22. The combination of the conduits, the sectional man-holes interposed therein at intervals, removable perforated false bottoms resting on the flanges of the lower sections, cables of separate wires passing through the conduits and man-holes and up through the false bottoms, casings or junction-boxes in which said cables unite, suspending-racks in the man-holes, and connections between the racks and cables, as set forth.

23. The combination of the bottom section of the man-hole, flanged ring-sections resting thereon, other sections composed of detachable segments, connecting-hubs attached to some of said segments, and a cone-shaped cap-section resting on flanges of the section below it, as set forth.

24. The man-hole segments constructed, as set forth, of plain segments, interposed flanged hub-sections, overlapping plates, and detachable fastenings uniting the three.

25. The combination of the tongue-shaped interlocking superposed tongued and grooved conduit-sections, their detachable bands, the overlapping hooks on the bands, and the locking-pins or wedge-rods, all constructed as set forth.

26. The combination of the interlocking superposed tongued and grooved conduit-sections, their end flanges, the side flanges on the bottom sections, the detachable clamps hooking on the side flanges and overlapping the detachable flanged top clamp, and the locking-pins or wedge-rods which fasten the parts securely together, as set forth.

27. The conduit constructed, as herein set forth, of the tongue-shaped interlocking tongued and grooved conduit-sections, their internal ledges, horizontal partitions, longitudinal grooves in the sections, and vertical flanges or division-plates integral with the horizontal partitions and fitting in the grooves, whereby the partitions of one section are firmly supported by the other.

28. The combination of the longitudinally internally-grooved conduit-sections and the series of separate detachable horizontal partitions provided with integral vertical ribs or flanges to fit in the grooves of the section or plate below it and with grooves to receive the flange of the plate above it.

29. The conduit constructed, as described, with tongue-shaped interlocking superposed tongued and grooved conduit-sections, their detachable bands, overlapping hooks, and locking-pins, longitudinal internal grooves and ledges, and flanged and grooved horizontal partitions, the flange of one partition resting in the groove below it, while its groove receives the flange of the partition above it, whereby the parts are easily removed or replaced and yet held securely in position, as set forth.

30. The combination of the sectional conduit, its removable partitions, the hubs for lateral branches detachably secured to the conduits over the hand-holes, and the bridge or connection pieces connecting the hubs and partition-plates, as set forth.

31. The combination of the conduit-sections, the removable partitions, the bell-mouthed hubs detachably secured to the conduit-sections, the branch pipes connected with the hubs, and the cables passing through the chambers formed by the partition and through the branch pipes and spliced in the hubs out of the way of the direct wires, as set forth.

32. The combination, substantially as herein set forth, of the trough-shaped conduit-sections, their internal division-plates, a lateral opening in the conduit-sections, branch conduits, and removable connection-pieces between the main and branch conduits adapted to the various divisions from which it is desired to lead the cables.

33. The combination of the conduit-sections, their partitions, the sectional terminal box, the cables passing through the chambers in the conduits, and terminal wires branching from said cables through openings in the packed joint of the terminal box at the line of junction of its sections.

34. The terminal box constructed, as set forth, of flat abutting sections having radial openings through which at their line of junction the branch wires pass.

In testimony whereof we have hereunto subscribed our names.

WILLIAM H. HART.
JAMES THORN GOODFELLOW.

Witnesses:
W. D. BALDWIN,
EDWARD C. DAVIDSON.